(12) United States Patent
Altendorfer et al.

(10) Patent No.: US 8,381,441 B2
(45) Date of Patent: Feb. 26, 2013

(54) INSERTABLE PLANT WATERING DEVICE AND RESERVOIR WITH INLET PIPE

(76) Inventors: George Altendorfer, St. Paul, MN (US); Perry Joseph Altendorfer, Apple Valley, MN (US)

( * ) Notice: Subject to any disclaimer, the term of this patent is extended or adjusted under 35 U.S.C. 154(b) by 459 days.

(21) Appl. No.: 12/632,616

(22) Filed: Dec. 7, 2009

(65) Prior Publication Data

US 2011/0131879 A1 Jun. 9, 2011

(51) Int. Cl.
*A01G 25/00* (2006.01)
(52) U.S. Cl. .................................. 47/81; 47/80
(58) Field of Classification Search ............... 47/81, 79, 47/80, 65.5, 66.1, 66.6, 48.5
See application file for complete search history.

(56) References Cited

U.S. PATENT DOCUMENTS

| 3,739,524 | A |  | 6/1973 | Rose |  |
|---|---|---|---|---|---|
| 4,344,251 | A |  | 8/1982 | Edling |  |
| 4,527,354 | A | * | 7/1985 | Sellier | 47/81 |
| 4,885,870 | A | * | 12/1989 | Fong | 47/79 |
| 4,991,346 | A | * | 2/1991 | Costa et al. | 47/80 |
| 5,806,242 | A | * | 9/1998 | Park | 47/81 |
| 5,921,025 | A | * | 7/1999 | Smith | 47/79 |
| 6,219,969 | B1 | * | 4/2001 | Dion | 47/79 |
| 6,226,921 | B1 | * | 5/2001 | Kang | 47/81 |
| 6,363,658 | B1 | * | 4/2002 | Lai | 47/79 |
| 6,505,440 | B1 | * | 1/2003 | Lai | 47/79 |
| 6,672,007 | B1 | * | 1/2004 | Lai | 47/79 |
| 6,675,533 | B2 |  | 1/2004 | Morlier |  |
| 7,171,783 | B1 | * | 2/2007 | Fidotti | 47/81 |
| 8,143,292 | B2 | * | 3/2012 | Schmidt et al. | 514/341 |
| 2004/0216377 | A1 |  | 11/2004 | Cox |  |

FOREIGN PATENT DOCUMENTS

GB 1098155 B1 1/1968

* cited by examiner

*Primary Examiner* — T. Nguyen
(74) *Attorney, Agent, or Firm* — Geiser Law, PLLC; Greg N. Geiser

(57) ABSTRACT

An insertable watering device for a standard bucket comprising, a circular planar base member, central chamber, plurality of wicks, fill tube, and support legs. The insertable device provides support for soil and allows for the watering of plants contained in the soil by capillary action using a wick through the transfer of water below the base member and into the soil layer.

20 Claims, 3 Drawing Sheets

INSERTABLE PLANT WATERING DEVICE AND RESERVOIR WITH INLET PIPE

BACKGROUND OF THE INVENTION

1. Field of the Invention

The present invention relates to a bucket and more specifically to an insert that is adapted to be inserted into a standard bucket to create a water reservoir and wicking element to keep soil moist and allow for improved plant growth.

2. Description of the Prior Art

Conventional self irrigating plant watering systems come in varying shapes, arrangements, and have a multitude of ways to deliver water to a plant. Some irrigators are designed to fit in specifically designed pots to accommodate the irrigator's structure or method. These irrigating systems have the added cost of requiring a custom manufactured pot.

Some irrigators are designed to fit into conventional horticultural pots. Typically, these pots are constructed out of clay or plastic and shaped with a taper creating a small base and large opening. The shape of this taper has been used by several inventors in the creation of self irrigating plant structures that create a reservoir by dividing the pot into sections. One section is used to contain water and the other section is used to contain soil or a soil like mix. Typically, water is transferred from the water section to the soil section using gravity or through capillary action by using a wick. These standard horticultural pots are good for growing ornamental plants that do not require a large amount of soil and depth. Further, because they are used for ornamental plants, the aesthetic appearance of the structure is important.

Plant and vegetable growers are continuously looking for new and unique systems to keep their plants watered and healthy, without a desire to have the aesthetic appearance of a standard horticulture pot. Further, manufacturers of these items are looking for ways to save money by lowering costs. Although there are several styles and types of irrigators, a need for other alternatives, preferably ones that are easier to manufacture and hold more soil and water, without sacrificing their utility are needed.

SUMMARY OF THE INVENTION

The present invention provides a plant watering device for insertion into a standard bucket comprising a bucket having side walls and a bottom, a circular planar base member adapted to fit inside the bucket and in communication with the bucket interior. This base member contains a central aperture, a radial aperture, and a plurality of apertures to allow for gravity fed water to move through the base member. A central chamber communicates through the central aperture of the base member and includes an open top, side walls defining an upper and lower end and containing a plurality of apertures to allow for the flow of water, and a central cavity in communication with the chamber interior. A plurality of wicks is in communication with the central cavity to deliver water to the soil. A fill tube in communication with the radial aperture of the base member and having an upper end extending beyond the bucket top and lower end below the base member to allow the user to pour water into the area beneath the base member when the bucket is full of soil and plants. A plurality of support legs are attached to the base member along its outer circumference adjacent to the bucket to support the base member and the soil placed above the base member. These support legs contain a foot in communication with the bucket bottom and side wall to create a gap between the bucket side wall and feet.

Preferably this watering device is made out of plastic due to its ability to be impervious to water, flexible, and easily modified to accommodate imperfections in the manufacture of buckets. Preferably the height of the support legs is 15% to 40% the height of the bucket to allow for the ample ratio of water to soil to utilize the full capacity of the standard bucket. Preferably the diameter of the center chamber is between 20% and 80% the diameter of the bucket interior and ideally its diameter is 3¼ inches. Preferably the length of the wicks are 18 inches to 24 inches long to allow for full penetration of the wick towards the height of the bucket.

In one preferred embodiment of the present invention, the height of the central chamber portion extends beyond the base member to create a lip. This protrusion of the central chamber above the base member helps to prevent soil from flowing into the center chamber cavity when the plant is watered. Preferably this lip extends ¼ of an inch to 1 inch beyond the top of the base member.

In another embodiment of the invention, the central chamber portion contains a bottom attached to the central chamber side walls. This bottom provides added support to the base member, provides a more robust configuration to the overall construction of the invention, and provides a barrier to soil, preventing the soil from mixing with the reservoir water should the insert not be fully inserted.

In another embodiment of the invention, the lower portion of the fill tube contains a plurality of holes to allow water to flow out. The height of these holes from the bottom end of the tube corresponds to the height of the support legs. This allows the fill tube to be inserted all the way to the bottom of the bucket and only allows water to escape the fill tube below the base member.

The main objective of the present invention is to provide for a novel bucket and insert for the separation of a standard five or six gallon bucket into a water compartment and soil compartment, and the delivery of water from the water compartment to the soil compartment through a plurality of wicks to allow for moist soil and provide excellent growing conditions for the growing of vegetables, such as tomatoes.

A still further object of the invention is to provide an insert for a standard five or six gallon bucket that a consumer can use for their existing buckets that provides for irrigation of plants and vegetables planted in the bucket.

BRIEF DESCRIPTION OF THE SEVERAL VIEWS OF THE DRAWING(S)

The accompanying drawings are included to provide a further understanding of the present invention and are incorporated in and constitute a part of this specification. The drawings illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying drawings, and wherein.

DETAILED DESCRIPTION OF THE INVENTION

Figure 1:
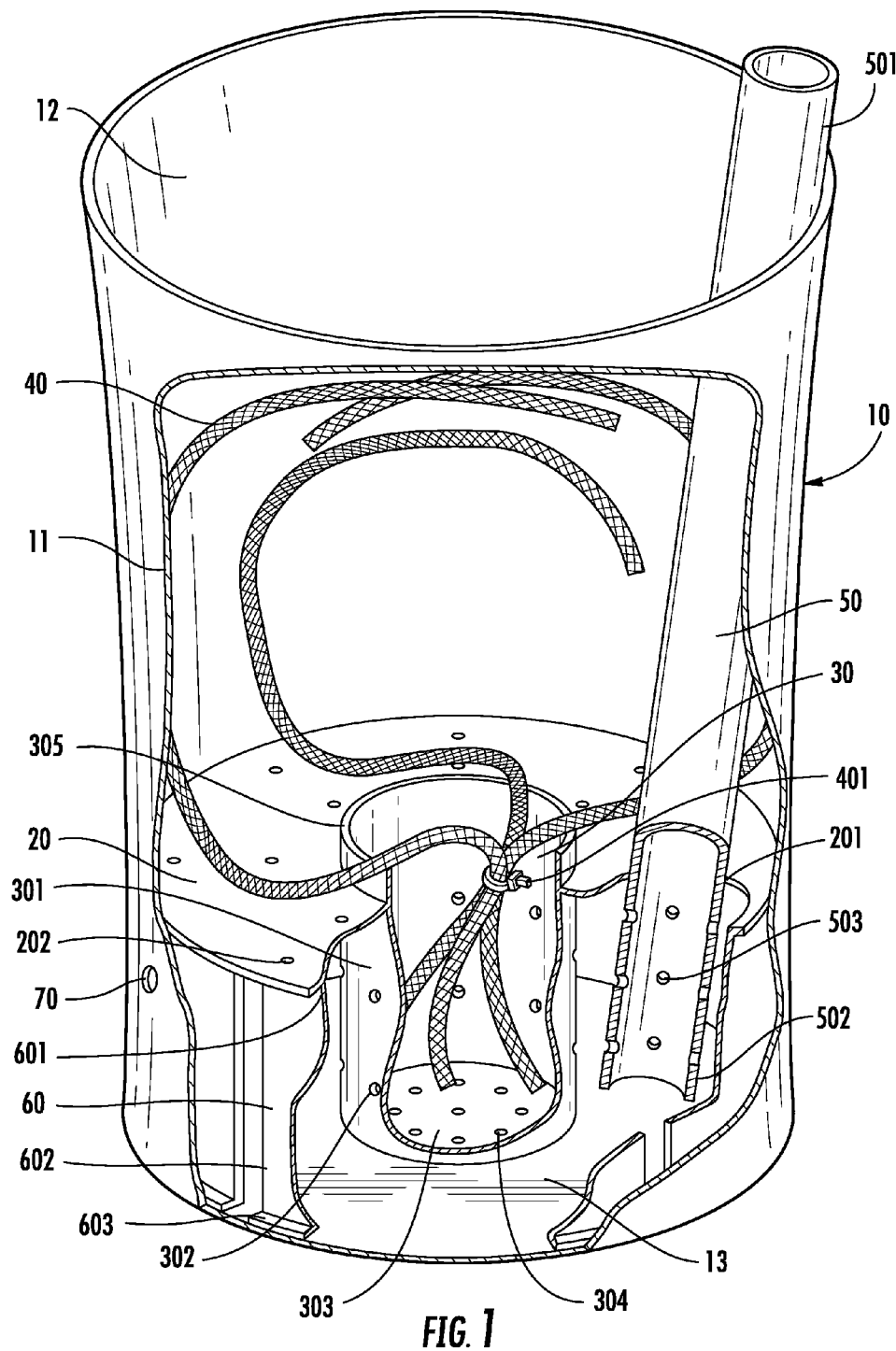
FIG. 1 is a perspective view of an insertable watering device according to the present invention.
Figure 2:
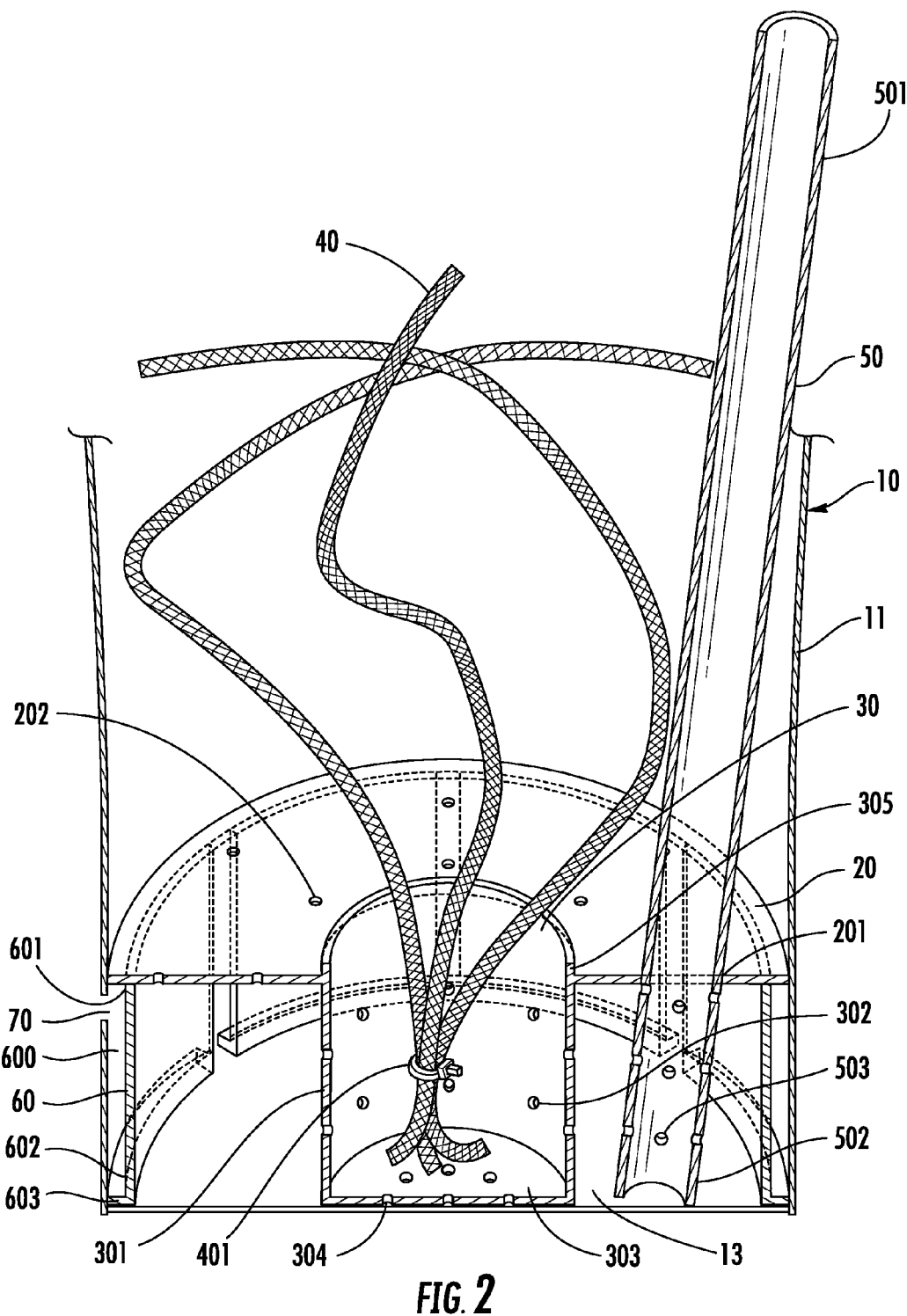
FIG. 2 is a cross sectional perspective front view of an insertable watering device according to the present invention.
Figure 3:
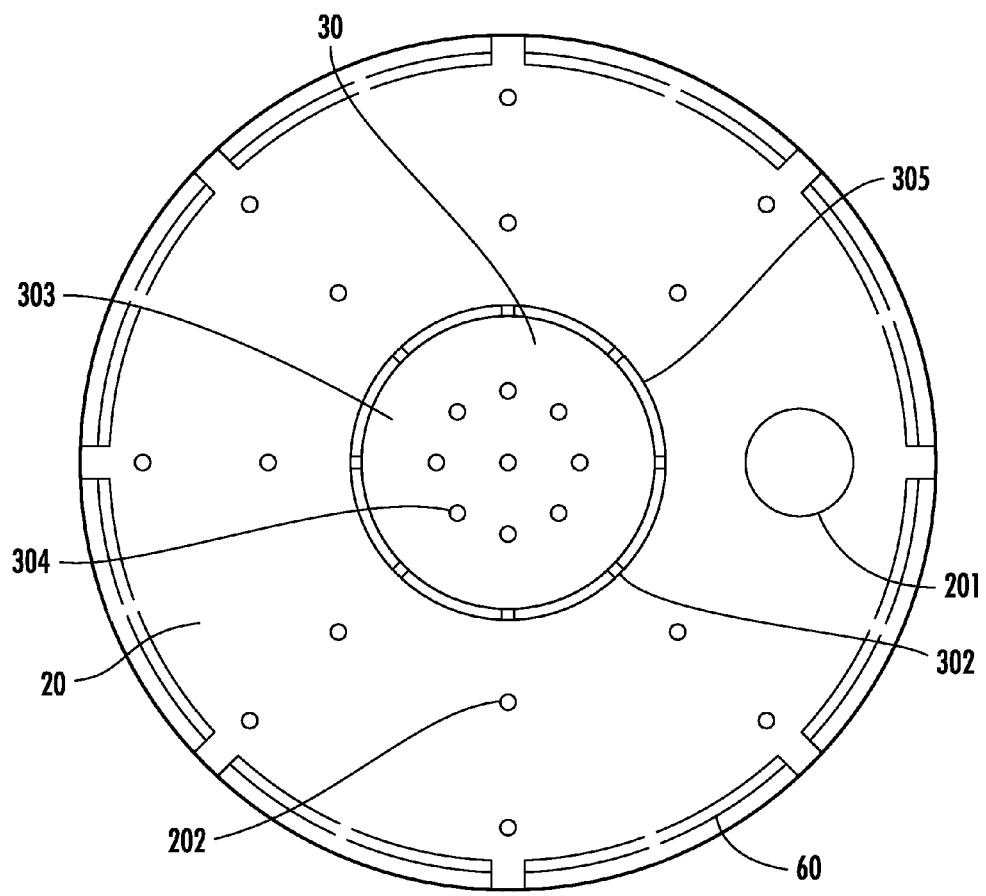
FIG. 3 is a top view of an insertable watering device according to the present invention.
Figure 4:
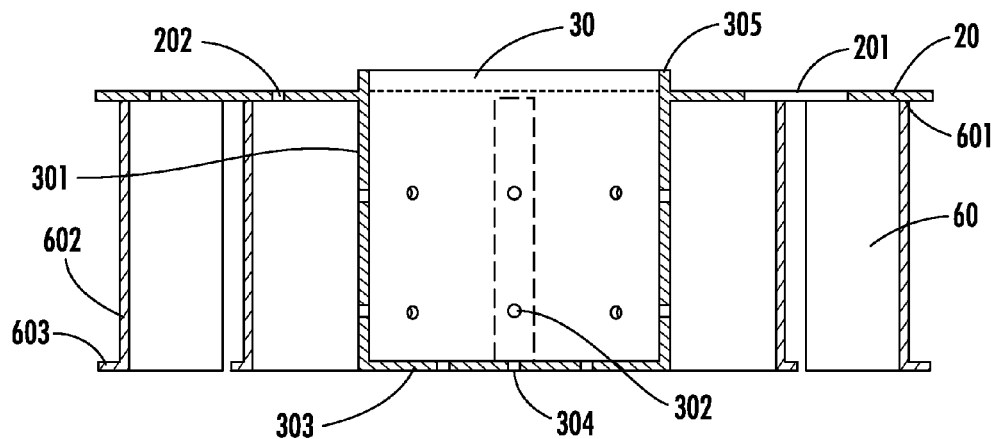
FIG. 4 is an enlarged cross sectional view of the insert without the bucket of an insertable watering device according to the present invention.

Referring now to FIGS. 1, 2, 3 and 4, insertable watering device according to the present invention, there is shown a bucket 10 of the standard five gallon type. Bucket 10 includes a cylindrically shaped outer peripheral wall 11 defining a bucket interior. Bucket 10 has an upper bucket end defining an opening 12 communicating with the bucket interior and the lower bucket interior. A bottom wall 13 is located at the lower bucket end and attached to the outer peripheral side wall 11.

A circular planar base member 20 adapted to fit inside the bucket 10 includes a central aperture (not numbered), a radial aperture 201, and a plurality of apertures 202 surrounding the central aperture. These apertures 202 allow water to flow freely through the base member 20 and into the lower bucket interior. The base member 20 is designed to create a seal between itself and the bucket interior. Ideally, this base member is constructed out of plastic ⅛ of inch thick, due to its elasticity, strength, and water impermeability properties. Further, the ideal diameter of the apertures 202 is 3/16 of an inch. This diameter allows water to move through the base member 20 while at the same time keeping soil out.

A central chamber 30 communicates through the central aperture (not numbered) of the base member 20 and includes an open top (not numbered) a side wall 301 defining a chamber interior (not numbered) and having an upper chamber end (not numbered) and a lower chamber end (not numbered). The lower chamber end (not numbered) is in communication with the bucket bottom wall 13. The side wall 301 includes a plurality of apertures 302. These apertures 302 allow water to flow freely into the central chamber 30 and into a central cavity (not numbered). The central cavity (not numbered) is in communication with the central chamber interior (not numbered). The central chamber 30 may also include a bottom 303 in communication with the bucket bottom wall 13. This bottom 303 contains a plurality of apertures 304 to allow for the free flow of water into the central chamber 30. This bottom 303 provides additional support for the support of the central chamber 30 and prevents soil from entering the water portion, should the central chamber 30 not be in communication with the bucket bottom wall 13. This width of the central chamber 30 should be between 20% and 80% of the bucket diameter with the ideal width 3½ inches.

In the preferred embodiment of the invention, the central chamber 30 extends vertically beyond the junction of the side wall 301 and base member 20. This extension creates a lip 305. This lip 305 prevents excess water from traveling along the base member 20 into the central chamber 30. Preferably the lip 305 is ¼ of an inch to 1 inch tall.

A plurality of wicks 40 communicate with the central cavity (not numbered). These wicks 40 are fastened together using a fastening means 401. The means for fastening can be a zip tie, metal clip, cord, glue, or any other means to adjoin the wicks together. The wicks 40 carry water from the central chamber towards the bucket opening 12 and into the soil through capillary action. Typically, the wick material is composed of a synthetic or natural fibrous material that absorbs water and has the ability to move this water from a water saturated area of the soil to an area of dry soil. Ideally, the wicks are between 18 inches and 24 inches to accommodate varying heights of buckets and adequately deliver water from the bottom of the bucket to the upper soil portion of the bucket using capillary action.

A fill tube 50 includes an upper end 501 extending beyond the bucket opening 12 and through the radial aperture 201 terminating in a lower end 502. The communication between the fill tube 50 and radial aperture 201 is designed to create a seal between the fill tube 50 and radial aperture 201. The lower end 502 of the fill tube 50 may extend to the bottom wall of the bucket 13 provided a plurality of apertures 503 are provided on the lower end 502 of the fill tube. Water is poured into the upper end 501 and travels through the tube into the space below the base member 20 exiting at the lower end 502 or through the apertures 503. This fill tube 50 is preferably constructed out of plastic due to its cost and its water impermeable features.

A plurality of arcuate shaped support legs 60 extend perpendicular from the base member 20 along its outer circumference adjacent to the outer peripheral wall 11 and include an upper portion 601 and lower portion 602. The upper portion 601 is attached to the base member 20. The bottom portion 602 has a horizontal foot 603 adjacent the bottom wall 13 extending outward and culminating at the outer peripheral wall 11 and forming a gap 600 between the support leg 60 and the outer peripheral wall 11. The gap 600 provides a space where soil that enters the bottom chamber can be flushed out to the periphery of the bucket and through a hole 70 in the bucket periphery 11. Ideally, the gap 600 is ¼ inch. The gap 600 distance is formed by the length of the horizontal foot 603. The hole 70 should be large enough to allow water and any soil that may enter the lower portion of the bucket to be flushed out, ideally the diameter of the hole 70 is ½ of an inch.

The height of the support legs 60 should be the same as the height of the central chamber 30 extending below the base plate 20. This height should be between 15% and 40% of the height of the bucket. This is the ideal range, as too small of a height requires frequent watering and too large of a height does not provide enough space in the upper portion to add the proper amount of soil required to provide plant roots with adequate support and nutrients.

What is claimed is:

1. An apparatus for growing and watering plants in a standard bucket comprising, in combination:
   a bucket including an outer peripheral side wall defining a bucket interior and having an upper bucket end defining an opening communicating with the bucket interior and a lower bucket end, the bucket having a bottom wall located at the lower bucket end and attached to the outer peripheral side wall;
   a circular planar base member having a circumference adapted to fit inside the bucket and in communication with the bucket interior, and having
      a central aperture,
      a radial aperture, and
      a plurality of apertures surrounding the central aperture to allow water to flow freely;
   a central chamber, the central chamber communicating through the central aperture and attached to the base member, and having
      an open top,
      a side wall defining a chamber interior and having an upper chamber end and a lower chamber end communicating with the bottom wall, the side wall having a plurality of apertures to allow water to flow freely,
      a central cavity, the central cavity communicating with the chamber interior;
   a plurality of wicks, the wicks fastened together and in communication with the central cavity;
   a fill tube, the fill tube having an upper end extending to the upper bucket end and a lower end communicating through the radial aperture, wherein water can enter the upper end and exit the lower end filling the area under the base member with water;

a plurality of arcuate shaped support legs extending perpendicular from the base member along the circumference adjacent to the outer peripheral wall, each leg having an upper portion and a bottom portion, the upper portion attached to the base member, and the bottom portion having a horizontal foot, the foot communicating with the outer peripheral bucket side wall and bucket bottom wherein a gap is created between the bucket side wall and support leg.

2. The apparatus of claim 1, wherein the upper chamber end extends vertically from the base member, and wherein the attachment between the base member and upper chamber end create a lip.

3. The apparatus of claim 1, wherein the plurality of wicks comprises at least three separate wicks.

4. The apparatus of claim 1, wherein the lower end of the fill tube has a plurality of holes.

5. The apparatus of claim 1, wherein the center central chamber comprises a second bottom wall, the second bottom wall attached to the chamber side walls further defining the chamber interior and creating the center cavity, and in communication with the first bottom wall.

6. The apparatus of claim 5, wherein the second bottom wall contains a plurality of holes.

7. The apparatus of claim 1, wherein the outer peripheral side wall has a through hole located below the circular planar base member allowing excess water to flow out of the bucket interior.

8. The apparatus of claim 7, wherein the hole is ½ inch in diameter.

9. An apparatus for growing and watering plants in a standard bucket comprising:
a circular planar base member having a circumference adapted to fit inside the bucket in communication with a bucket interior, and having
a central aperture,
a radial aperture, and
a plurality of apertures surrounding the central aperture to allow water to flow freely;
a central chamber, the central chamber communicating through the central aperture and attached to the base member, and having
an open top,
a side wall defining a chamber interior and having an upper chamber end and a lower chamber end communicating with the bottom wall, the side wall having a plurality of apertures to allow water to flow freely,
a central cavity, the central cavity communicating with the chamber interior;
a plurality of wicks, the wicks fastened together and in communication with the central cavity;
a fill tube, the fill tube having an upper end extending to the upper bucket end and a lower end communicating through the radial aperture, wherein water can enter the upper end and exit the lower end filling the area under the base member with water;
a plurality of arcuate shaped support legs extending perpendicular from the base member along the circumference adjacent to the outer peripheral wall, each leg having an upper portion and a bottom portion, the upper portion attached to the base member, and the bottom portion having a horizontal foot, the foot communicating with the outer peripheral bucket side wall and bucket bottom wherein a gap is created between the bucket side wall and support leg.

10. The apparatus of claim 9, wherein the upper chamber end extends vertically from the base member, and wherein the attachment between the base member and upper chamber end create a lip.

11. The apparatus of claim 9, wherein the central chamber comprises a second bottom wall, the second bottom wall attached to the chamber side walls further defining the chamber interior and creating the center cavity, and in communication with the first bottom wall.

12. The apparatus of claim 11, wherein the second bottom wall has a plurality of holes.

13. The apparatus of claim 9, wherein the plurality of wicks comprises at least three separate wicks.

14. The apparatus of claim 9, wherein the lower end of the fill tube has a plurality of holes.

15. An apparatus for growing and watering plants in a standard five gallon bucket comprising, in combination:
a five gallon bucket, the bucket having an open top, side wall, and a bottom wall;
a circular planar base member having a circumference adapted for insertion into the bucket, and having
a central aperture,
a radial aperture, and
a plurality of apertures surrounding the central aperture to allow water to flow freely;
a central chamber, the central chamber communicating through the central aperture and attached to the base member, and having
an open top,
a side wall defining a chamber interior and having an upper chamber end and a lower chamber end communicating with the first bottom wall, the side wall having a plurality of apertures to allow water to flow freely,
a central cavity, the central cavity communicating with the chamber interior;
a plurality of wicks, the wicks fastened together and in communication with the central cavity;
a fill tube, the fill tube having an upper end extending out of the bucket top and a lower end communicating through the radial aperture, wherein water can enter the upper end and exit the lower end filling the area under the base member with water;
a plurality of arcuate shaped support legs extending perpendicular from the base member along the circumference adjacent to the bucket side wall, each leg having an upper portion and a bottom portion, the upper portion attached to the base member, and the bottom portion having a horizontal foot, the foot communicating with the bucket side wall and bucket bottom wall wherein a gap is created between the bucket side wall and support leg.

16. The apparatus of claim 15, wherein the upper chamber end extends vertically from the base member, and wherein the attachment between the base member and upper chamber end create a lip.

17. The apparatus of claim 15, wherein the central chamber comprises a second bottom wall, the second bottom wall attached to the chamber side walls further defining the chamber interior and creating the center cavity, and in communication with the bottom wall.

18. The apparatus of claim 17, wherein the second bottom wall has a plurality of holes.

19. The apparatus of claim 15, wherein the plurality of wicks comprises at least three separate wicks.

20. The apparatus of claim 15, wherein the lower end of the fill tube has a plurality of holes.

* * * * *